United States Patent [19]

Scott

[11] Patent Number: 5,360,968
[45] Date of Patent: Nov. 1, 1994

[54] "CONSENSUS SYNC" DATA-SAMPLING SYSTEMS AND METHODS

[75] Inventor: Kevin C. Scott, Rochester, N.Y.

[73] Assignee: Eastman Kodak Company, Rochester, N.Y.

[21] Appl. No.: 822,237

[22] Filed: Jan. 17, 1992

[51] Int. Cl.$^5$ .............................................. G06K 7/10
[52] U.S. Cl. .................................... 235/454; 235/456
[58] Field of Search ............... 358/345, 346, 447, 466, 358/54, 138, 314, 336, 337, 335, 463, 340, 409, 443; 348/616, 97, 112; 360/44, 40, 51, 35.1; 375/23, 106, 110; 329/313; 307/511, 516; 235/454, 456; 250/570; H04N 1/40

[56] References Cited

U.S. PATENT DOCUMENTS

| | | | |
|---|---|---|---|
| 2,994,863 | 8/1961 | Trapnell | 340/347 |
| 3,452,331 | 6/1969 | Barlett | 340/173 |
| 3,473,164 | 10/1969 | Jensen | 340/173 |
| 3,474,418 | 10/1969 | Jensen | 340/173 |
| 3,479,652 | 11/1969 | Foster | 340/173 |
| 3,501,586 | 3/1970 | Russell | 178/6.7 |
| 3,624,284 | 11/1971 | Russell | 178/6.7 |
| 3,795,902 | 3/1974 | Russell | 340/173 |
| 3,806,643 | 4/1974 | Russell | 178/6.7 |
| 3,961,315 | 6/1976 | Yokoyama | 340/173 |
| 4,288,816 | 9/1981 | Kashioka et al. | 358/138 |
| 4,345,314 | 8/1982 | Melamud et al. | 358/447 |
| 4,419,693 | 12/1983 | Wilkinson | 358/167 |
| 4,603,414 | 7/1986 | Ackerman et al. | 369/118 |
| 4,833,722 | 5/1989 | Morton et al. | 382/22 |
| 4,853,795 | 8/1989 | Morton et al. | 358/447 |
| 4,982,294 | 1/1991 | Morton et al. | 358/465 |
| 5,014,333 | 5/1991 | Miller et al. | 358/466 |
| 5,124,806 | 6/1992 | Heitmann | 358/320 |
| 5,126,835 | 6/1992 | Wilkinson | 358/314 |

Primary Examiner—Tommy P. Chin
Assistant Examiner—Huy Nguyen
Attorney, Agent, or Firm—Raymond L. Owens

[57] ABSTRACT

Image processing systems and methods for retrieving digital data stored in a plurality of contiguous data cells on photographic film. An image sensor samples the image data at a plurality of pixel positions in each of the data cells and generates grayscale image data that is processed into a one-dimensional stream of binary pixels. A data sampling system processes the binary pixels by first selecting those binary pixels that correspond to the data cell centers. Then, a digital output signal is constructed from the selected pixels to represent the original data stored on the film. The stream of binary pixels are read in series. In particular, transitions, detected in the stream of binary pixels, are used to periodically estimate the data cell pitch and the transition phase. A plurality of, e.g. N, suggested distances from the current pixel to the next sampling point are located using the transition phases of the most recent N transitions. A preferred sampling phase is determined through a histogram to find a consensus among the N suggested distances. The digital output signal is constructed from those pixels that occur at the preferred sampling phase.

36 Claims, 11 Drawing Sheets

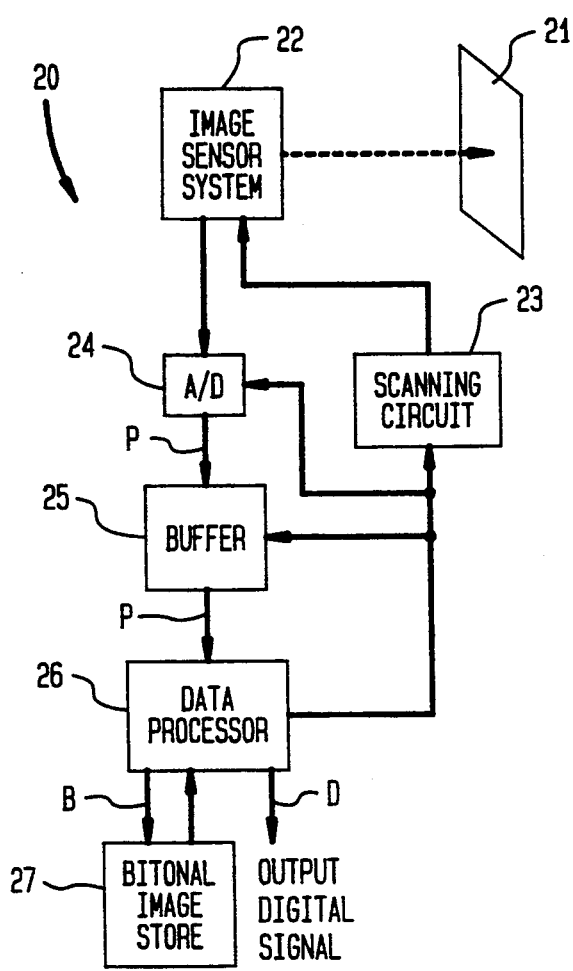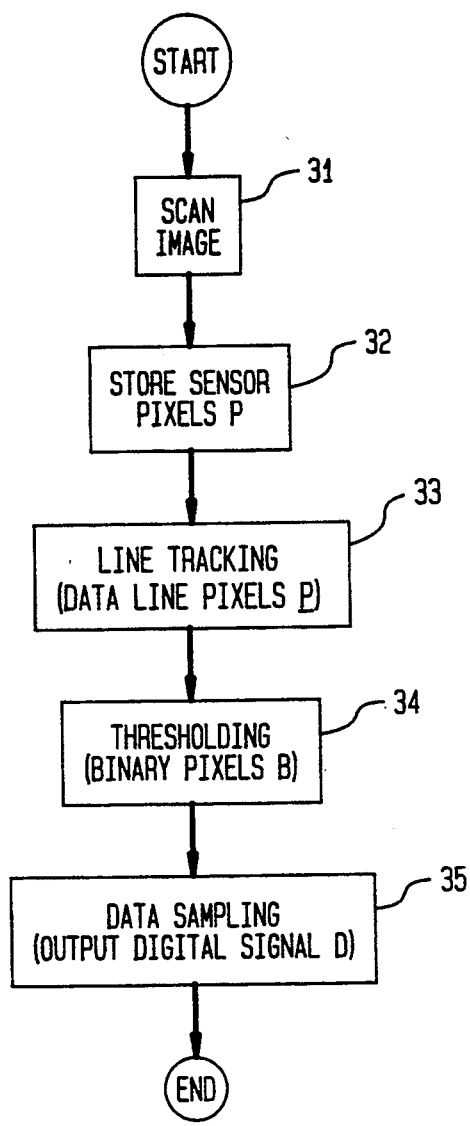

TEST DATA

PITCH = BITWIDTH = $\dfrac{\#X. \text{ (NO. SAMPLING POINTS)}}{\#B. \text{ (NO. PIXELS)}}$

CIRCULAR HISTOGRAM NUMBER OF
SUGGESTED DISTANCES VS. PIXEL INTERVALS

"CONSENSUS SYNC" DATA-SAMPLING SYSTEMS AND METHODS

TECHNICAL FIELD OF THE INVENTION

The present invention relates to the field of image processing and, more particularly, to data-sampling systems and methods for retrieving digital data.

BACKGROUND ART

In the data storage field, microfilm has found widespread use as an inexpensive, permanent storage medium for a variety of data. When used for storing large quantities of digital data, microfilm typically records bits of digital data, such as binary ones and zeros, as black and white images confined to predetermined film areas called "data cells." Photographic recording processes often format the digital data into a compact array of rows and columns.

Image processors retrieve recorded digital data from microfilm by first scanning the film with an optical sensor. Such scanning generates digital strings of grayscale image data representing, for each sensor pixel, several levels of luminescence ranging from black to white; for example, an 8-bit byte associated with a sensor pixel can represent black, white, and 254 shades of gray. Thereafter, the image processor converts the scanned grayscale image data into binary image data through a thresholding process that, for example, may represent all grayscale image data above a certain level as a binary one and below that level as a binary zero. After thresholding, the image processor converts the binary image data into an output stream of digital data, which represents the original digital data stored on the film.

Additional detailed discussions regarding systems that are designed to retrieve digital data stored on film may be found in my copending, commonly assigned U.S. patent application, entitled "System and Method for Bidirectional Adaptive Thresholding," Ser. No. 07/797,630; filed Nov. 25, 1991, which is incorporated by reference herein. Descriptions of prior art systems for recording or reading digital data on film also appear in the following U.S patents issued to Russell (hereinafter collectively referred to as the "Russell" patents): U.S. Pat. Nos. 3,501,586 (issued Mar. 17, 1970); 3,624,284 (issued Nov. 30, 1971); 3,795,902 (issued Mar. 5, 1974) and 3,806,643 (issued Apr. 23, 1974); and in U.S. Pat. No. 4,603,414 (issued to Ackerman et al on Jul. 29, 1986).

In order to retrieve digital data from film, the digital data must be accurately sampled at proper locations. Usually, the data must be sampled at specific pixel positions. This often means that the sampling system must be accurately synchronized to the film. Various prior art systems, such as those described in the Russell patents, achieve this synchronization by using a conventional phase-locked loop to adjust the speed of the film or the frequency of an oscillator. In any case, maintaining bit-to-bit synchronization will normally require that various scanning parameters be continuously adjusted in order to vary both sampling phase and sampling pitch.

Although prior art systems have served the purpose, for several reasons, they have not proved entirely satisfactory in maintaining bit-to-bit synchronization under all conditions of service. First, many prior art systems do not adjust for gradual changes in data-cell size and spacing. Such changes often result from changes in magnification that are inherent in and over time occur in most conventional optical scanners. Second, other prior art systems cannot compensate for growth and shrinkage of exposed areas of the film, i.e., actual changes in data-cell size across a scan line. In this regard, conventional photographic processes often create slight variations in the sizes of the exposed film areas during data recording. Third, still other prior art systems cannot accurately retrieve data from film marred or disfigured by dirt, scratches, fingerprints, or other artifacts. Marred or disfigured film areas may introduce false black-white transitions, or they may move or erase existing transitions.

DISCLOSURE OF THE INVENTION

The general purpose of this invention is not only to provide systems and methods for retrieving data from a data storage medium that has a plurality of data cells in which discrete values are stored, but also to eliminate the deficiencies associated with such data retrieval system known in the art.

To attain this, the present invention contemplates a unique data-sampling technique that accurately finds sampling phase and pitch while effectively compensating for distortions in, inter alia, data-cell size, spacing and content.

The systems and methods of the present invention sample data at a plurality of points in each of the data cells to generate a stream of data samples. Transitions in the data samples are detected as the samples are processed. The pitch of the data cells is periodically estimated based on the distance between two recent transitions. The phases of the transitions are determined based on a current estimate of data-cell pitch. A preferred sampling phase is then identified by finding a consensus of the phases of a set of the most recent transitions. A data output signal is then constructed from the data samples that occur at the preferred sampling phase, thereby providing an output that represents the original data.

The present invention may be used in image processing systems and methods to retrieve digital data stored in a plurality of contiguous data cells. In this aspect of the invention, an image sensor samples the image data at a plurality of pixels in each of the data cells and generates grayscale image data that is processed into a one-dimensional stream of binary pixels. A data sampling system process the binary pixels to locate those pixels that correspond to the data cell centers so that a digital output signal may be constructed that represents the original data stored on the film. The stream of binary pixels are read serially. Transitions detected in the stream of pixels are used to periodically estimate the data cell pitch and the transition phase. A plurality, e.g. N, suggested distances from the current pixel to the next sampling point are located using the transition phases of the most recent N transitions. A preferred sampling phase is then determined through a histogram to find a consensus of the N suggested distances. A digital output signal is constructed from those pixels that occur at the preferred sampling phase.

BRIEF DESCRIPTION OF THE DRAWINGS

The teachings of my invention will be readily understood by considering the following detailed description in conjunction with the accompanying drawings, in which:

FIG. 1 is an overall block diagram of the preferred embodiment of my invention;

FIG. 2 is a flow diagram which illustrates the operation of the preferred embodiment shown in FIG. 1;

To facilitate understanding, identical reference numerals have been used, where possible, to denote identical elements that are common to various figures.

MODES OF CARRYING OUT THE INVENTION

Figure 3:
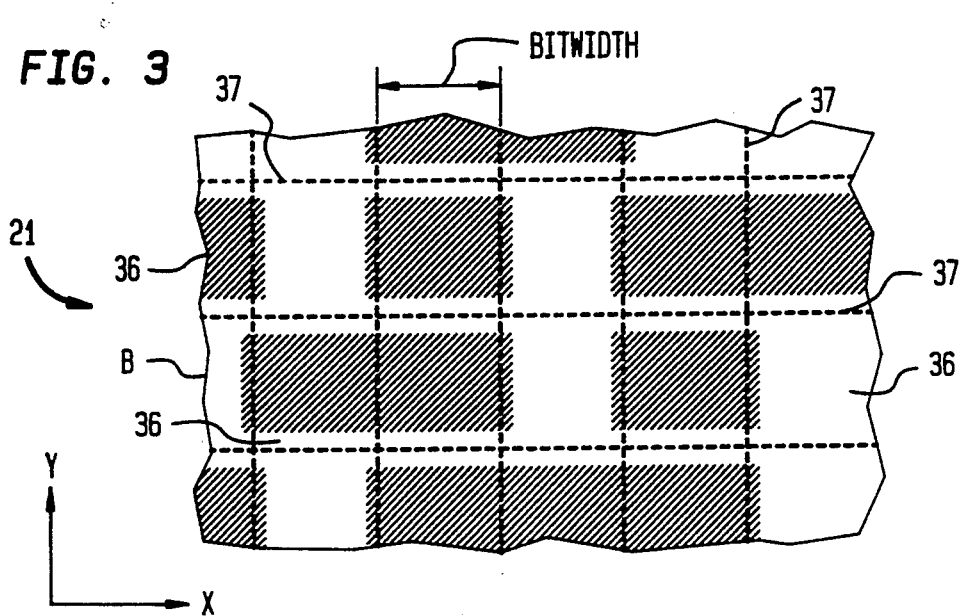
FIG. 3 is a plan view of a portion of film 21.

Referring now to the drawings, FIG. 1 shows image processing system 20 for retrieving digital data that is stored as a grayscale image on film 21. Processing system 20 includes an oversampling image sensor system 22. Under the control of scanning circuit 23, sensor system 22 optically reads the grayscale images on film 21 and produces an analog video output. Analog-to-digital (A/D) converter 24 generates grayscale image data from the analog video output. The grayscale image data consists of a series of quantized, multi-level sensor pixels P. Storage buffer 25, connected to the output of A/D converter 24, stores sensor pixels P. Data processor 26 processes the contents of buffer 25 into binary pixels B. Bitonal image store 27 stores binary pixels B. Data processor 26 converts binary pixels B into an output digital signal D that represents the original digital data stored on film 21.

The flow diagram of FIG. 2 illustrates the operation of processing system 20. In step 31, data processor 26 provides timing signals to scanning circuit 23, thereby causing image sensor system 22 to scan an image stored on medium 21. As system 22 scans the image, buffer 25 stores resulting sensor pixels P, through step 32, via A/D converter 24. Data processor 26 then performs a series of data processing steps that converts stored multi-level sensor pixels P into output digital signal D. These data processing steps include line-tracking procedure 33, thresholding procedure 34 and data-sampling procedure 35.

Figure 4:
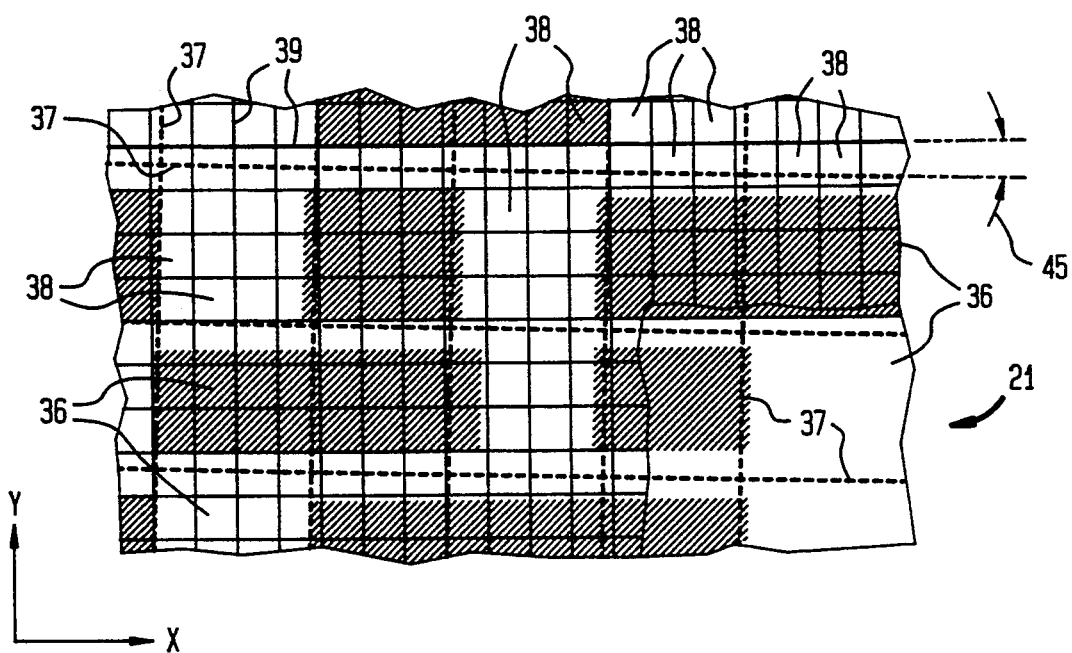
FIG. 4 is a plan view showing a superposition of film 21 in FIG. 3 and a grid of sensor pixel positions 38.

FIGS. 3 and 4 schematically depict the data-scanning and reading processes. FIG. 3 illustrates a section of film 21 with the digital data recorded in so-called data "cells" 36. Dashed lines 37 in FIG. 3 define data cells 36. The digital data appear as rows of black and white areas on film 21. Photographic processes generate the black areas (shown by cross-hatching) by exposing the film to light at desired cell locations. The white areas are generated by not exposing the appropriate locations of the film to light.

Data reading, depicted schematically in FIG. 4, involves optically scanning film 21 with sensor system 22 (see FIG. 1). System 22 may comprise an array of pixel sensors, such as well known charge-coupled devices (not shown). The sensors of system 22 scan film 21 and sense the amount of light emitted from each sensor pixel position 38. A grid of solid lines 39, superimposed on film 21 in FIG. 4, defines the sensor pixel positions 38. The size of sensor pixel positions 38 permits oversampling of data cells 36. FIG. 4 shows the pixel pitch to be at least three times the pitch of data cells 36, both in the X and Y directions. Oversampling insures that there are always at least two sensor pixel positions 38 per film data cell 36 in each axis direction (X and Y) that do not extend beyond the boundary of the data cell. One of these sensor pixel positions 38 will also include the center of data cell 36 in which it resides.

Figure 5:
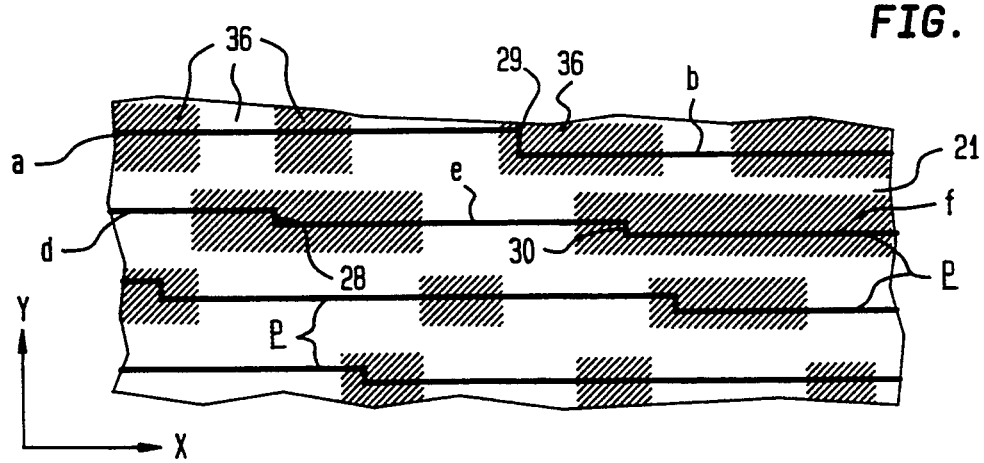
FIG. 5 is a plan view, similar to the view shown in FIG. 3, of film 21.

Line-tracking procedure 33, depicted schematically in FIG. 5, performs vertical selection of sensor pixels P. This procedure effectively "deskews" the images stored on film 21 with respect to the alignment of the array of pixel sensors, which may be skewed at some arbitrary angle 45 (see FIG. 4). Line-tracking procedure 33 will not be necessary in all situations. However, it will normally be required when, as in the present case, the film 21 contains data cells that are arranged in narrow, closely spaced rows such that mechanical alignment of the film is difficult. However, in the case where the vertical profile of the data cells is large, e.g., a conventional bar-code format, line-tracking procedure 33 may be omitted since precise film alignment will not be critical.

As seen in FIG. 5, line-tracking procedure 33 involves the process of selecting the data-line pixels P. In this regard, processor 26 (see FIG. 1) selects those pixels P that lie on the horizontal lines that pass closest to the centers of data cells 36. For example, in the top row of data cells 36 (see FIG. 5), processor 26 first tracks sensor pixels P in horizontal row a and then in the next lower horizontal row b, with the shift therebetween taking place at point 29. In the next row of data cells 36, processor 26 makes two tracking shifts, first from row d to the next lower row e at point 28 and then to row f at point 30. Data processor 26 selects the appropriate row of pixels by comparing the relative positions of the black and white areas in the vertical direction and the rows of pixels P that fall on the continuous white horizontal spaces that vertically separate the rows of data cells 36 from each other. The set of pixels tracked in line-tracking procedure 33 are called data-line pixels P.

Thresholding procedure 34 (see FIG. 2) involves the process of converting data-line pixels E into binary pixels B. In thresholding procedure 34, data processor 26 quantizes those data-line pixels P that have a value above a predetermined threshold level into one digital value, e.g., a binary one, and quantizes those pixel values below the threshold level into another digital value, e.g., a binary zero. The resulting binary pixels B will appear as a one-dimensional stream of binary pixel values. The bitonal image store 27 stores this stream of values.

Given this one-dimensional stream of pixel values, data processor 26 then performs data-sampling procedure 35 to generate output digital signal D representing the original digital data stored on film 21. To do so, data-sampling procedure 35 picks sampling points at approximately periodic intervals. Thereafter, processor 26 chooses pixels, from data-line pixels P, those that fall on the centers of data cells 36 in order to form output digital signal D. As stated above, to maintain the proper sampling phase, data-sampling procedure 35 must compensate for apparent changes in data-cell size (often caused by gradual changes in magnification across the scan line), growth or shrinkage of the exposed areas of film 21, and film distortions such as dirt, scratches, and other artifacts that can introduce false white-black transitions. Also, such distortions can move or erase existing data-cell edges, which may also result in false transitions.

In performing data sampling, procedure 35 finds the sampling phase based on a consensus of the majority of recently encountered transitions that appear in the stream of binary pixels B. Specifically, the phase of each transition in the binary data will suggest a particular sampling phase. Since most, but not all, transitions will occur at their proper location, data-sampling procedure 35 examines the phases of a reasonably large number of recent transitions. An analysis is made of these transition phases to obtain the preferred sampling phase. The analysis is based on finding a consensus among these transition phases.

Because the transitions are used to obtain synchronization, it is important that the data being retrieved from film 21 have a sufficient number of transitions that lie within a reasonable distance along the scan line. This condition can be readily satisfied by using conventional channel coding schemes that guarantee the occurrence of a transition within a fixed maximum distance. For example, if the data words used in the coding scheme are defined so that there is at least one transition in each data word, a transition would be guaranteed to occur at least in two adjacent data words.

Data-sampling procedure 35 begins by determining an estimate of the pitch of the data stored on film 21. This initial data-pitch estimate is found by determining the horizontal width of data cells 36, which is called the bitwidth and is expressed in numbers of pixels per data cell. As will be seen below, the bitwidth is periodically updated as the process proceeds. The initial estimated bitwidth is referred to as the initial bitwidth and is found by processor 26 during initializing process 40 shown in FIG. 7. In particular, to determine the initial bitwidth, a test pattern is placed on film 21. An illustrative test pattern, as shown here in FIG. 6, contains seven bits alternating between the binary values "1" and "0". The test pattern can be placed on film 21 as a series of alternating black and white areas located in the first seven data cells 36. Of course, the pattern may also include false transitions thereby giving an inaccurate initial bitwidth value. However, as will be seen in detail below, system 20 will quickly move into a steady state condition where the bitwidth will be periodically updated from the actual data.

Figure 6:
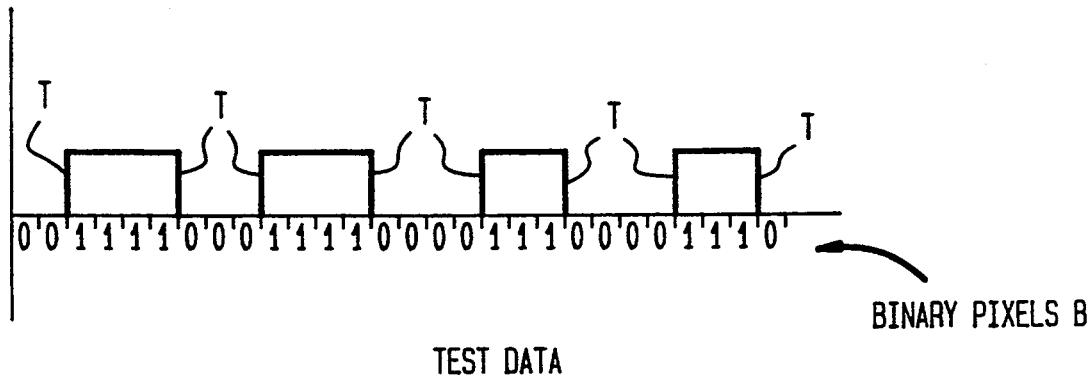
FIG. 6 is a graph of a waveform useful in understanding the invention.

FIG. 6 shows a waveform that represents those binary pixels B that are the result of reading the test pattern. The pixels B are shown in FIG. 6 as a two-level waveform with the corresponding binary values of the binary pixels B placed beneath the waveform. The first two pixels B have a binary value "0", the next four pixels B have a binary value "1", the next three have a binary value "0", and so forth. Overall, the waveform of FIG. 6 has eight transitions T with twenty-five binary pixels B located between the first and last transitions.

Figure 7:
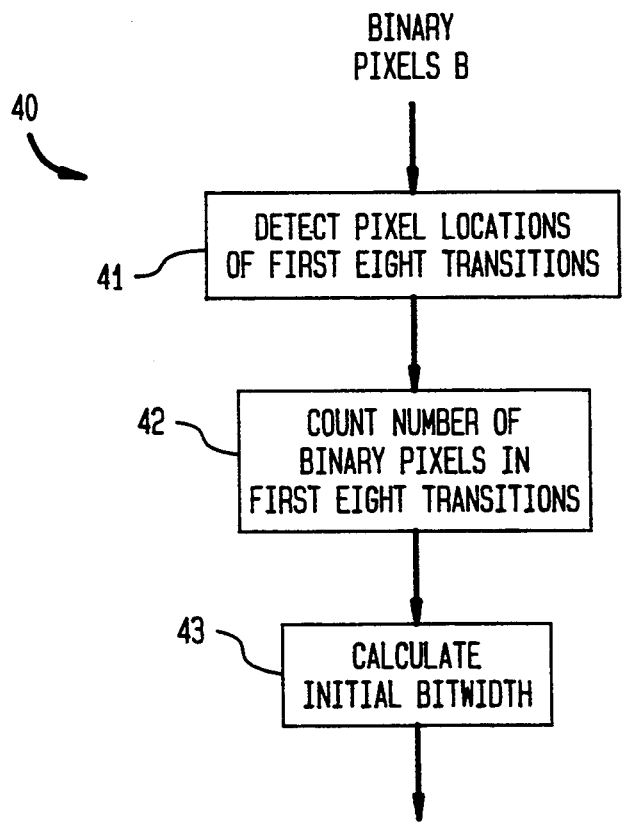
FIG. 7 is a block diagram which illustrates one portion of data-sampling procedure 35 shown in FIG. 2.

Processor 26, as it performs step 41 shown in FIG. 7, tracks the binary pixels B and locates the first eight transitions T. In step 42, the processor counts the number of binary pixels B that have occurred between the first and last transitions T. The initial bitwidth is then calculated by the processor in step 43 by dividing the number of binary pixels B, determined in step 42, by the number of data cells 36 which in this case is one less than the number of transitions T. For the illustrative situation depicted in FIG. 6, the initial bitwidth is 3.5714 pixels per data cell (25 pixels/7 data cells).

Throughout this description specific values are assigned to many of the system parameters. These specific values are chosen merely for purposes of illustration and are used to particularly describe the operation of the inventive embodiments. When possible, the same values will be used in other examples described below.

The above procedure for measuring the initial bitwidth usually produces a coarse estimate of the actual bitwidth since only a small number of data cells 36 are used. The accuracy of the initial bitwidth may be improved appreciably by using a larger test pattern, or by using a complete row or two of the actual data. In the latter case, processor 26 could process a few rows of data to obtain an initial bitwidth and then return to these rows and reprocess them to obtain suggested sampling point distances. As an alternate procedure, an operator may manually input an initial bitwidth.

Figure 8:
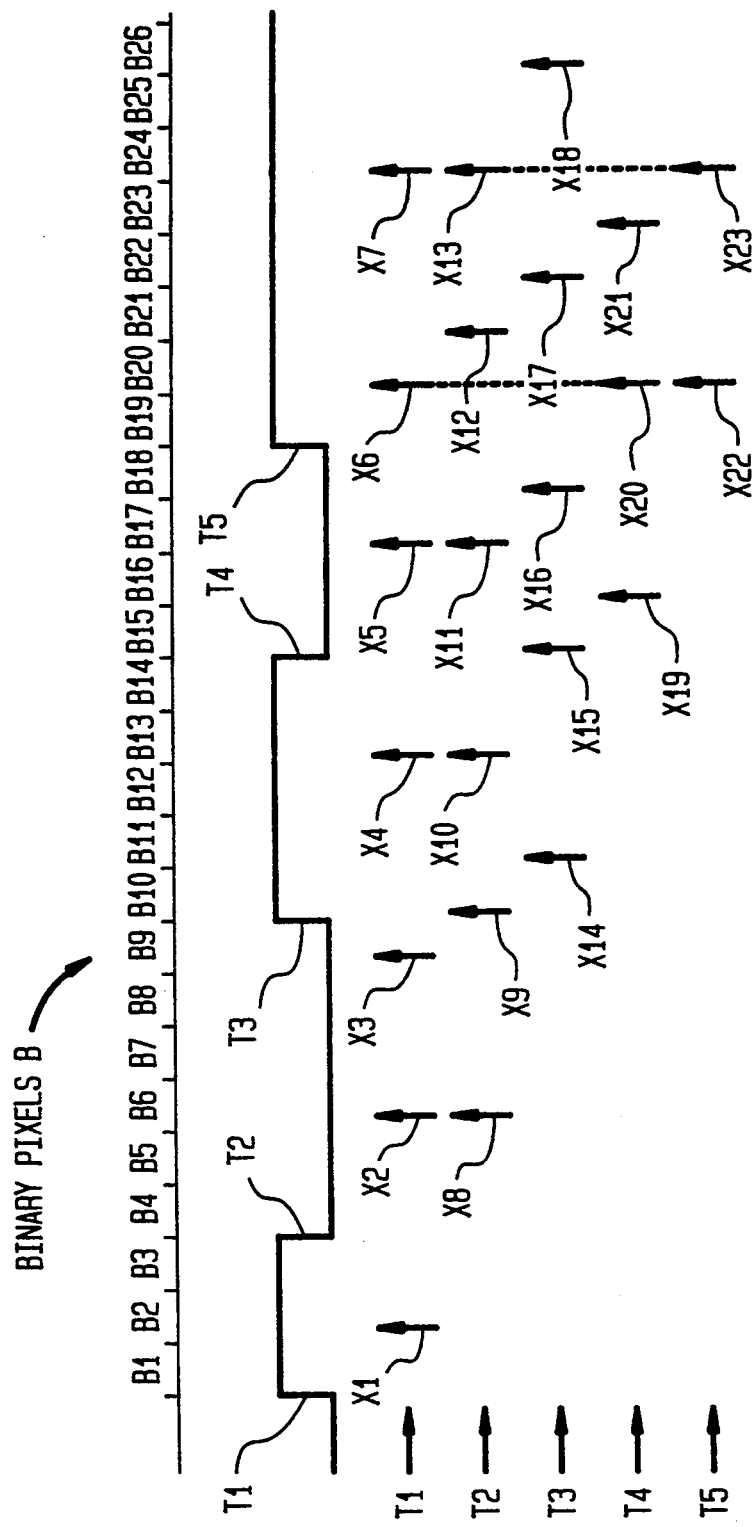
FIG. 8 is a graph of a waveform which illustrates the operation of another portion of the data-sampling procedure 35 shown in FIG. 2.

FIG. 8 includes a waveform that illustrates how the sampling phase is determined from a representative stream of binary pixels B1–B20 having five transitions T1–T5. The phase of each transition T will suggest a particular sampling phase. For example, using first transition T1 and the initial bitwidth, the phase of the first suggested sampling point X1 will be the pixel that is located one-half the bitwidth from transition T1. Consequently, first sampling point X1 of the representative example will occur at second binary pixel B2 from transition T1 because one-half the initial bitwidth is 1.7857 pixels, a value that places the center of first data cell 36 at second binary pixel B2.

Still using the first transition T1 and the initial bitwidth of 3.5714 pixels/cell, the suggested sampling point X2 is calculated to be 1.5 bitwidths (i.e. 5.3571 pixels) from transition T1 which corresponds to sixth binary pixel B6. The remaining sampling points X3–X7 in the first row are located 2.5, 3.5, 4.5, 5.5 and 6.5 bitwidths from transition T1 and correspond to the binary pixels B9, B13, B17, B20 and B24, respectively.

The next row of suggested sampling points X8–X13 contains those points that are suggested by the phase of transition T2. Point X8, located 1.5 bitwidths from transition T2, corresponds to pixel B6. It is noted here that, for simplicity, the initial bitwidth value of 3.5714 is used to locate all of the sampling points X1-X23 shown in FIG. 8. However, the value of the bitwidth will be updated frequently and preferably after each inphase transition T is encountered, as will be discussed below.

It is seen from FIG. 8 that most of the sampling points based on the phases of transitions T1 and T2, correspond to common pixels. Specifically, points X2 and X8 correspond to pixel B6, points X4 and X10 correspond to pixel B9, points X5 and X11 correspond to pixel B17, and so on. As such, these sampling points may be viewed as being "in phase". Sampling points X3 and X9, seen to be "out of phase", correspond to pixels B9 and B10, respectively. Also, points X3 and X9 have different binary values, i.e., pixel B9 is a binary "0" while pixel B10 is a binary "1".

With reference to the third row of suggested sampling points shown in FIG. 8, points X14-X18 are seen to be out of phase with all of the sampling points in the first two rows. Sampling points X14-X18 are based on measurements from transition T3. There are a number of reasons that the corresponding sampling points are out of phase. One reason may be that the bitwidth is inaccurate due to shrinkage or expansion of the data cell sizes across the scan line or the magnification has changed, as discussed above. For this reason, it is important that the bitwidth be updated as often as possible. Another reason that corresponding suggested sampling points X are out of phase can be that a particular transition T may be false due to dirt, scratches, or other artifact(s) that appear on film 21.

The fourth row of sampling points shown in FIG. 8 shows two points X19 and X21, which are out of phase with all of the other sampling points, and one point X20, which is in phase with points X6 and X22. The fifth and last row of sampling points X22 and X23 are in phase with corresponding sampling points X6 and X7 in the first row, point X20 in the fourth row and point X13 in the second row.

From the above analysis of FIG. 8, it is seen that the suggested sampling phases, based on different transitions T, will not always be the same but will greatly depend on the accuracy of the locations of the transitions T and the current estimated value of the bitwidth. Since most, but not all, transitions T will occur at their proper position (i.e., at a pixel B that corresponds to the nearest boundary of its corresponding data cell 36), data-sampling procedure 35 determines the correct sampling phase based on a consensus of the majority of recently encountered transitions T and the sampling points suggested thereby.

Figures 9, 10:
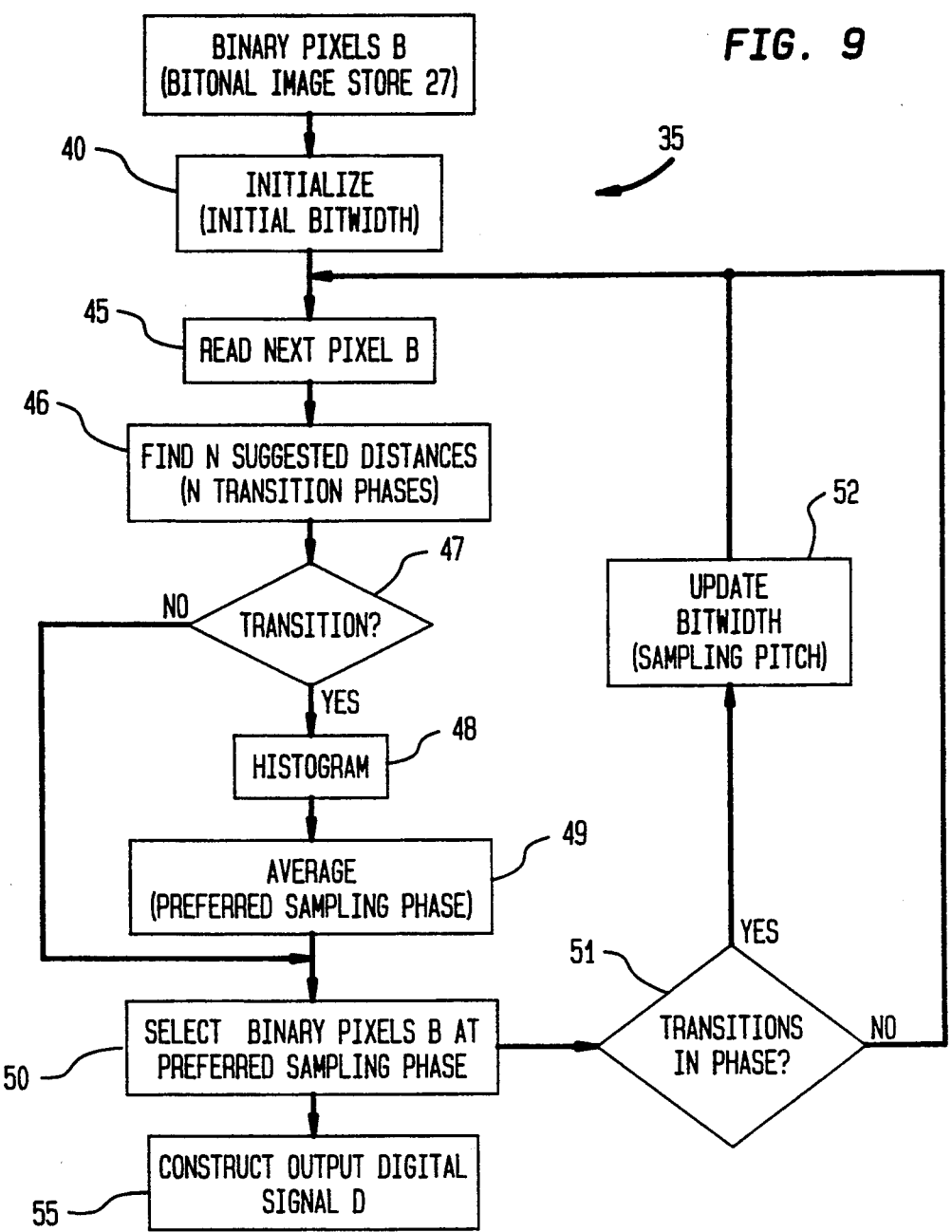
FIG. 9 is a detailed flow diagram which illustrates the data-sampling procedure 35 shown in FIG. 2.
FIG. 10 is a graph of a waveform which illustrates those parameters used in finding the sampling pitch by updating the bitwidth in step 52 of FIG. 9.

Data-sampling procedure 35, shown in detail in FIG. 9, begins with initializing process 40 (see FIG. 7) which reads the test pattern and determines the initial bitwidth. From the set of stored pixels B in bitonal store 27, data processor 26, through step 45, then reads the next pixel B. N suggested distances from the present pixel B to the next sampling point X, as suggested by each of the last N transitions T, are then found through step 46. If the pixel read in step 45 involved a transition T, as determined in step 47, a new preferred sampling phase will be found in steps 48 and 49 in a manner to be described below. If, however, the last-read pixel B did not involve a transition T, procedure 35 advances directly from decision step 47 to step 50 where data processor 26 can select pixels B located at the preferred sampling phase. Those "in-phase" pixels B selected in step 50 are then used in step 55 to construct the output digital signal D.

Decision step 51, when executed by data processor 26, analyzes all transitions T as they are detected and compares their phase to the preferred sampling phase previously found in step 49. Transitions that are found to be properly phased indicate the presence of a legitimate data-cell edge at the present pixel B. Such transitions are used to update the bitwidth in step 52. If a transition is found, through step 51, to be out of phase, then the current bitwidth is retained.

FIG. 10 illustrates the parameters used in step 52 to update the bitwidth. Specifically, the bitwidth is updated by dividing the number of binary pixels (#B) by the corresponding number of sampling points (#X) that have occurred between two widely spaced transitions Ti and Tf.

Figure 11:
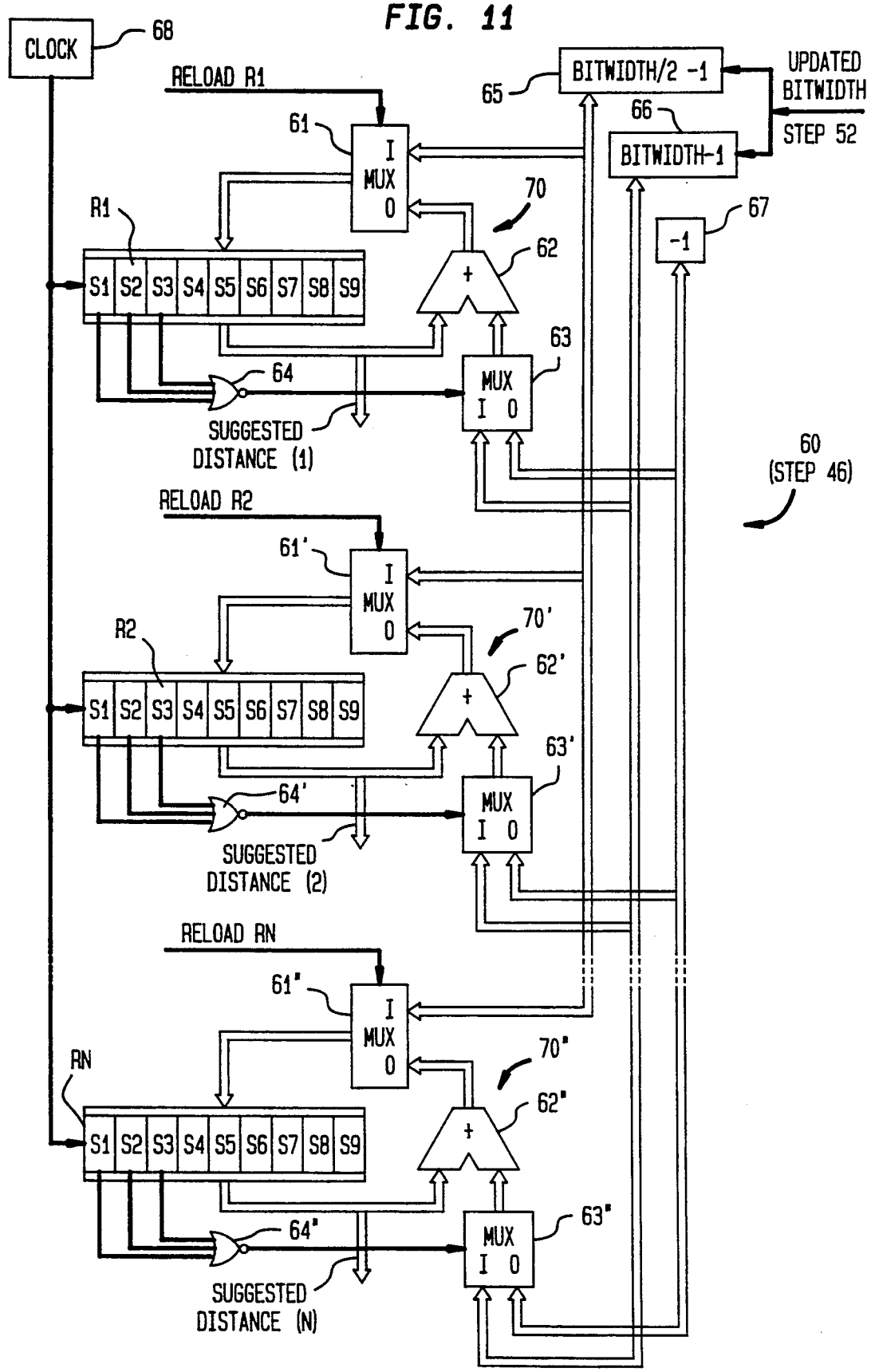
FIG. 11 is a block diagram of an alternate embodiment of a portion of the data processor 26 shown in FIG. 1.

Data processor 26 may be implemented by programming a general purpose digital computer to perform the steps of procedure 35 shown in FIG. 9. However, certain steps, such as step 46, of this procedure may in some cases be preferably implemented on a special purpose digital processor. FIG. 11 illustrates a special purpose digital system 60 designed to perform the function of step 46 in FIG. 9.

System 60 shown in FIG. 11 includes a bank of N registers R1-RN located in N similar circuit branches, three of which are shown and labeled as 70, 70' and 70". Each of registers R1-RN has a number of stages S1-S9. In a manner to be described below, the contents of registers R1-RN will be updated on each cycle, that a pixel is read in step 45, to indicate N suggested distances from the current pixel to the next sampling point based on the phases of the most recent N transitions T. The suggested distances will be non-integer values, with the units therefor being in numbers of pixels. In the present embodiment, the first three register stages S1-S3 contain the integer portion of the distances while the six stages S4-S9 contain the fractional portion of the distances. For example, a typical non-integer suggested distance stored in stages S1-S9 may be "011.100111" pixels. This suggested distance has a corresponding decimal value of 3 39/64 or approximately 3.6094 pixels.

In addition to registers R1-RN, branches 70-70" include multiplexers (MUXs) 61-61", adders 62-62", MUXs 63-63" and NOR gates 64-64", respectively. System clock 68 is connected to each register R1-RN. A set of reload inputs is connected to the control inputs (not specifically labeled) of MUXs 61-61". The output of each of MUXs 61-61" is connected, via a nine-input bus, to the input of each corresponding register R1-RN. The number of lines in all of the buses shown in FIG. 11 equals the number of stages in registers R1-RN, which here is illustratively nine.

One input of each of MUXs 61-61" is connected to the output bus of circuit 65 that calculates the value (bitwidth/2 − 1). The other input to each of MUXs 61-61" is connected to the output bus of the respective adders 62-62".

One input to each of adders 62-62" is derived from the output bus of register stages S1-S9 of the respective registers R1-RN. The other inputs of adders 62-62" are connected to the output buses from MUXs 63-63", respectively The inputs of each of MUXs 63-63" are connected to the output buses from circuit 67, which contains the value (−1), and the output bus of circuit 66, which contains the value (bitwidth−1). MUXs 63-63" are controlled by the outputs of NOR gates 64-64", respectively. Three inputs to each of the NOR gates 64-64" are connected to the integer stages S1-S3 of the registers R1-RN, respectively. All of the stages S1-S9 of each register R1-RN, besides being respectively connected to an input of adders 62-62" are connected to suggested distance output terminals.

The operation of system 60 will now be described. System clock 68 synchronizes the reading of the binary pixels B. Each time a transition T is encountered as the pixels B are read, a different one of registers R1-RN is reloaded with the current value (bitwidth/2−1) from circuit 65 via the appropriate MUX 61-61". For example, when the first transition T is encountered, only MUX 61 will receive a reload control signal, causing the current value in circuit 65 to be placed at the input bus of stages S1-S9 of register R1. When register R1 is next clocked by clock 68, the value (bitwidth/2−1) will be placed therein.

Using the numbers from the example previously discussed, the initial value in circuit 65 would be (initial bitwidth/2−1)=(3.5714/2−1)=0.7857. This value would be supplied to register R1 as "000.110010" (the number 0.7857 being rounded to the nearest binary number, i.e. 0.7813). Number "000.110010" would be supplied to register R1 at the time that pixel B1 is being read and the transition T1 is detected (see steps 45 and 47 shown in FIG. 9) and accepted on the next clock pulse. As indicated above, after the first clock pulse, the contents of register R1 would be the distance from current pixel B2 to first sampling point X1 as suggested by the phase of transition T1. Because the number "000.110010" indicates that the distance from pixel B2 to sampling point X1 is between 0.0 and 1.0, the sampling point X1 corresponds to the current pixel, i.e. pixel B2.

On this clock pulse, system 60 will read the next pixel B (see step 45 shown in FIG. 9). Continuing to use the example shown in FIG. 8, the clock pulse advances the process to pixel B2. Since no transition will have been detected, the output from decision step 47 shown in FIG. 9 is "NO". Therefore, none of MUXs 61-61" (see FIG. 11) will receive a control signal. Consequently, MUX 61 will place the output of adder 62 on the input bus of register R1. At this point, one input to adder 62 will be the current contents of register R1 (i.e. the value "000.110010") while the other input will be the output of MUX 63, i.e., either the value (−1) or the value (bitwidth−1) depending on the state of NOR gate 64. Since the contents of register R1 are less than zero, the inputs to NOR gate 64 will be 000 causing its output to be high and the output of MUX 63 to be (bitwidth−1)=(3.5714−1)=2.5714=010.100101. Adder 62 will then add this value to the contents of register R1 to obtain the value "011.010111" (i.e. in decimal form the value "3.3594"), which will be placed on the inputs to register R1 via MUX 61. After the second clock pulse, the contents of register R1 will indicate that the distance from the current pixel B3 to the next suggested sampling point X2 is 3.3594 pixels. Since this number is between 3.0 and 4.0, sampling point X2 will be three pixels from the current pixel B3, which corresponds to pixel B6 (see FIG. 8).

On each of the next three cycles, pixels B3, B4, B5 are read and processed in succession. Each clock pulse will cause the value in register R1 to be decreased by 1.0 via circuit 67, MUX 63, adder 62 and MUX 61, indicating that the distance from the current pixel to sampling point X2 is getting smaller by one pixel as the process proceeds pixel-by-pixel. Of course, these same functions will also be occurring in banks 70' and 70". When pixel B5 is reached, the transition T2 shown in FIG. 8 will be detected, causing a control signal to be applied to MUX 61" so that register R2 is reloaded with the current value of (bitwidth/2−1) from circuit 65. The bitwidth value may have been updated via step 52 (see FIG. 9) if the transition T1 was found to be in phase in step 51. If the bitwidth value was updated, the values at the outputs of circuits 65 and 66 at this time will also be new, updated values.

To summarize, as the process proceeds pixel-by-pixel, registers R1-RN will be reloaded in succession with the current value (bitwidth/2−1) each time that a transition T is encountered. The reloaded values (bitwidth/2−1) are obtained from circuit 65. At each $N^{th}$ transition, the cycle will be repeated starting with register R1.

Except in the case when a register is being reloaded with a value from circuit 65, the contents of registers R1-RN will either be decreased by 1.0 or increased by the current value (bitwidth−1). In most cases, registers R1-RN are decreased by 1.0. However, when the contents of a register R1-RN are less than 1.0, as detected by NOR gates 64-64", the contents of that register are instead increased by (bitwidth−1) on the next clock pulse.

In the steady state, the contents of registers R1-RN at any instant will contain N suggested distances from the current pixel B to the next sampling point X based on the locations of the last N transitions T. In steps 48 and 49 these N suggested distances are used to identify a preferred sampling phase by finding a consensus of these N suggested distances.

Assuming that the number N is sixteen, a typical value, then the preferred sampling phase in the above example would have been found using sixteen transition phases. Each transition T would have defined for at least fifteen apparent data cells 36 spanning over fifty pixels B. Of course, some of these transitions T may be false meaning that the number of actual data cells 36 may be less than fifteen. However, substantially more than fifteen data cells 36 will usually be involved since, on the average, there will normally be several data cells 36 per transition T.

Figure 12:
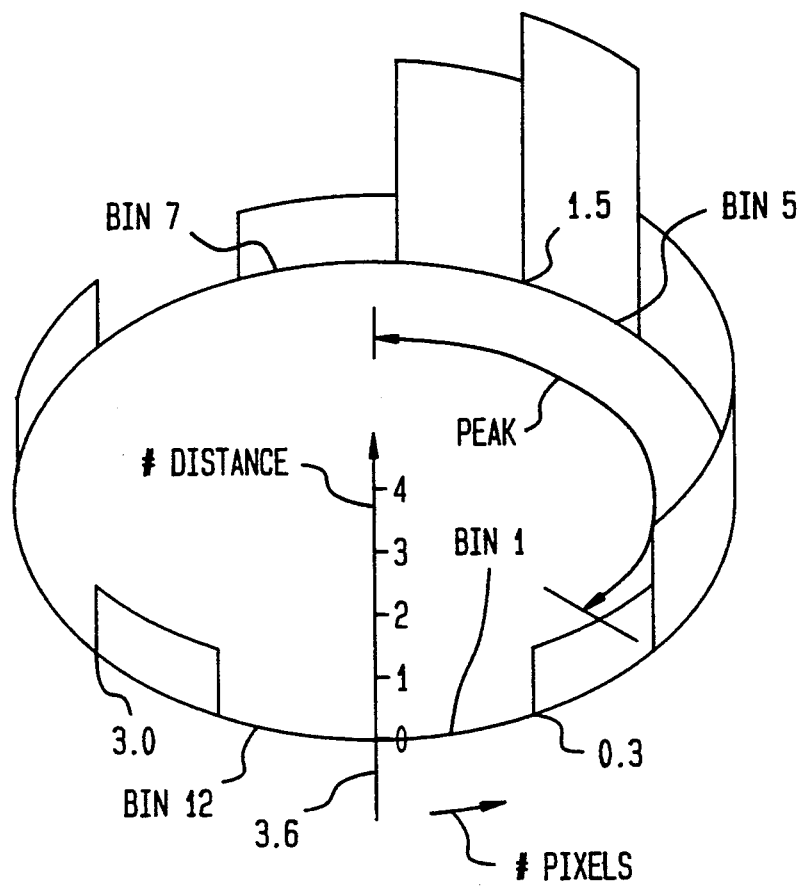
FIG. 12 is a histogram useful in understanding step 48 shown in FIG. 9.

Data processor 26 in step 48 searches for a group of closely spaced suggested distances using a histogram (see FIGS. 9 and 12). The N suggested distances stored in the registers R1-RN are used to construct histogram 80. In particular, the histogram represents a distribution function relating the number of the N suggested distances (vertical scale) to the pixel intervals in which they are found (horizontal scale). Since the N suggested distances "recycle" between 0.0 and bitwidth, histogram 80 is constructed as a circular histogram having a circumference substantially equal to bitwidth. A new histogram 80 is constructed each time that a new transition T is encountered. For example, histogram 80 shown in FIG. 12 contains twelve equal bins that each represents a 0.3 pixel interval. The heights of the eight vertical bars represent the numbers of suggested distances having values that fall in the corresponding bins.

For the illustrated example, the first bin is empty, meaning that there are no suggested distances having values that fall between 0.0 and 0.3 pixel. Those bins that contain counts of suggested distances are as follows: bins 2, 7, 9, 11—1 count each; bins 3, 4—2 counts each; bin 5—4 counts; and bin 6—3 counts for a total count of fifteen counts.

Histogram 80 is then searched for a peak using a fixed number of adjacent bins that span just over one pixel. In the example shown in FIG. 12, histogram 80 is searched over four adjacent bins that span 1.2 pixels. The sets of adjacent bins are searched to find that particular set which produces a peak. For example, histogram 80 shows a four-bin peak for bins 3, 4, 5, 6; the total count for these four bins is eleven. In effect, this means that the contents of eleven of the registers R1-RN have suggested distances to the next sampling point that are close enough to each other to be viewed as being in phase. Processor 26 averages the values of these eleven in-phase suggested distances in step 49 (see FIG. 9) to obtain the preferred sampling phase. The preferred sampling phase is expressed as the integer pixel distance from the present pixel to the next actual sampling point X. This preferred phase is retained and used until the occurrence of the next transition at which time a new preferred sampling phase is determined. Binary pixels B are then selected at the preferred sampling phase via step 50. Output digital signal D is constructed from the selected pixels B in step 55.

In step 52, the bitwidth (i.e. sampling pitch) is updated using only in-phase transitions. Therefore, before bitwidth can be updated in step 52, it must first be determined if the most-recent transition was an in-phase transition. If the most recent transition was in-phase it will be used as transition Tf when updating the bitwidth (see FIG. 10).

FIGS. 13-16 show an alternate embodiment for finding the preferred sampling phase using the suggested distances at the outputs of registers R1-RN. This embodiment uses a special purpose digital processor that processes the suggested distances as a new circular histogram on each clock cycle, i.e. on each reading of a pixel B. The processor finds the peak of the circular histogram on each cycle and tracks its pixel location as it moves around the histogram, the circumference of which is equal to or slightly greater than one bitwidth. As the peak moves around the histogram, its location in terms of bin number becomes smaller since the suggested distances to the next sampling point are being decreased by one on each clock cycle. When the bin number of the histogram peak reaches a minimum, the peak is at the preferred sampling phase.

Figure 13:
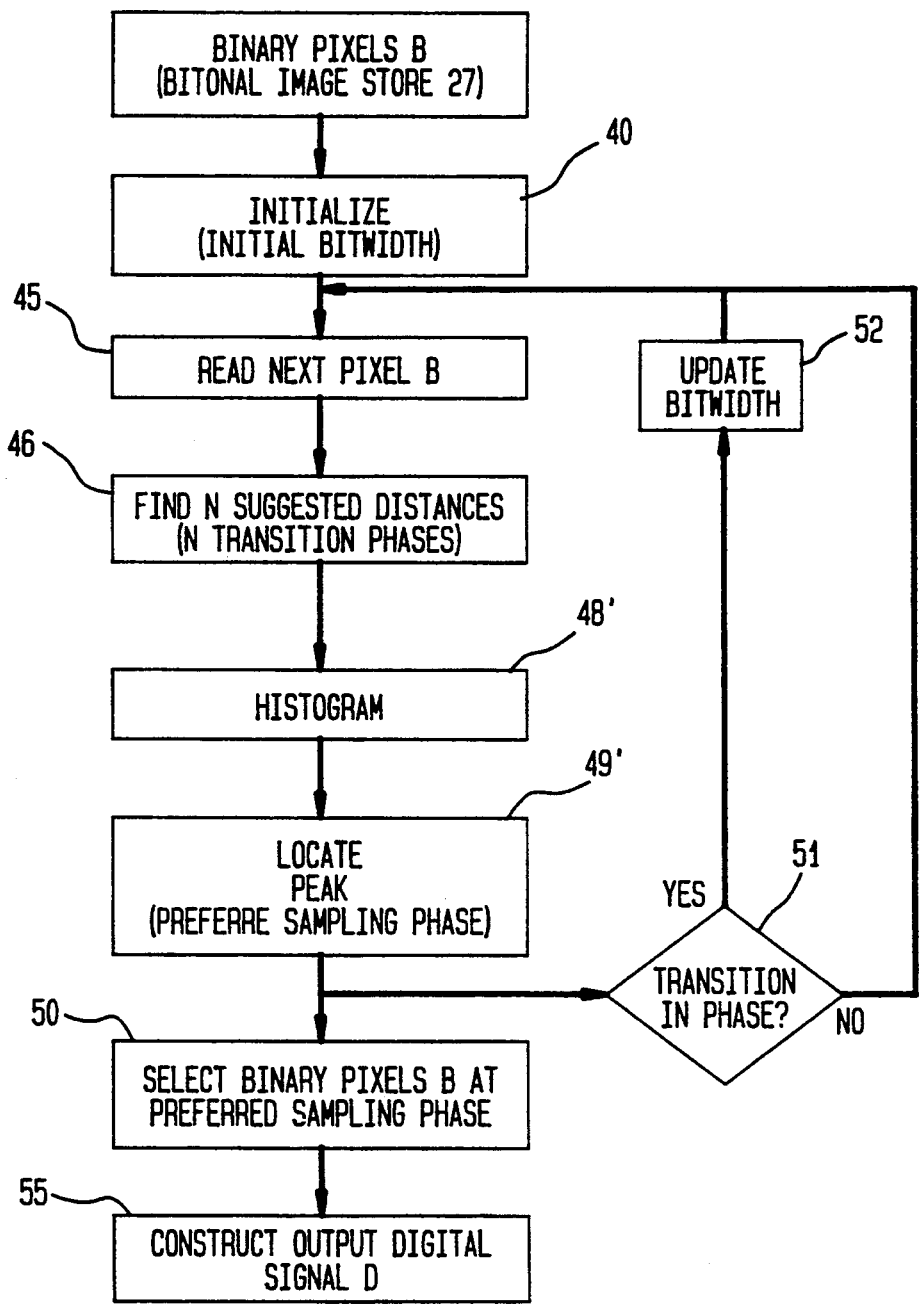
FIG. 13 is a detailed flow diagram, similar to FIG. 9, which illustrates an alternate embodiment of my present invention.

The steps depicted in FIG. 13 are similar to those shown in FIG. 9. However, in the embodiment shown in FIG. 13, a new histogram is constructed in step 48' on each clock cycle, i.e. each time that a pixel B is read via step 45. In step 49', the histogram peak is located and tracked on each clock cycle. The preferred sampling phase occurs when the peak passes the origin of the histogram.

Figure 14:
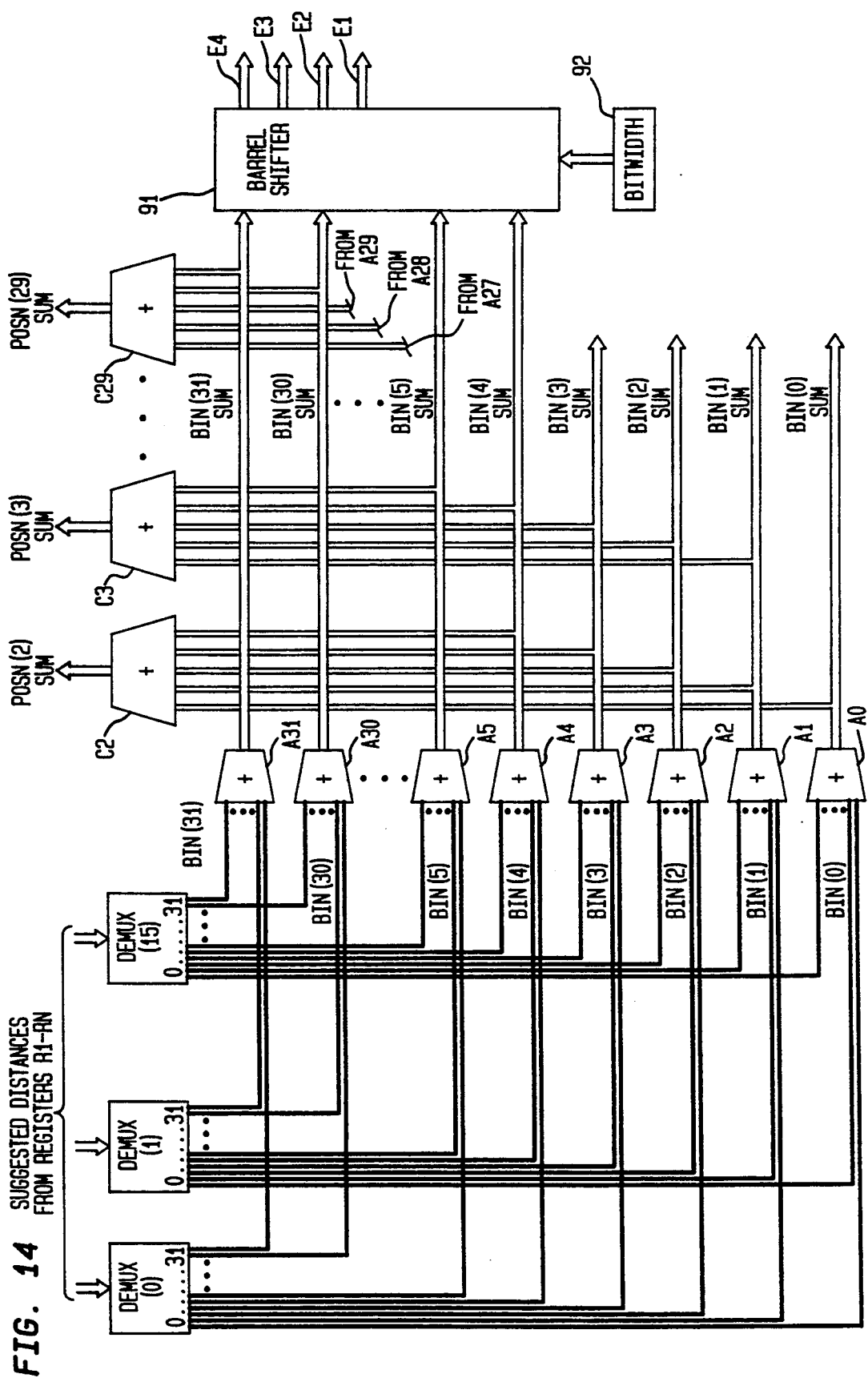
FIG. 14 is a block diagram showing a portion of a special purpose digital processor that performs the histogram functions of step 48' shown in FIG. 13.
Figure 15:
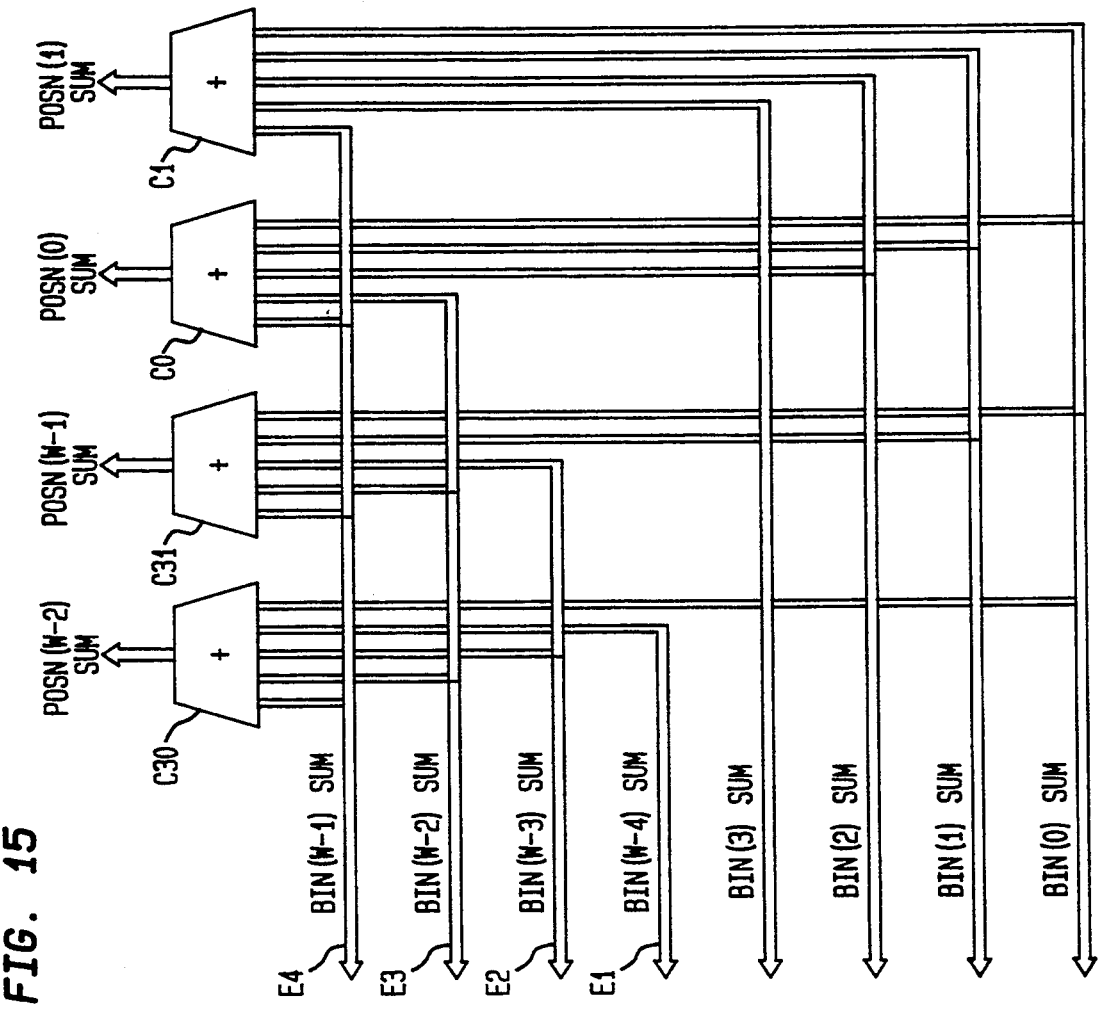
FIG. 15 is a block diagram showing another portion of the special purpose digital processor shown in FIG. 14 that performs the histogram functions of step 48' shown in FIG. 13.
Figure 16:
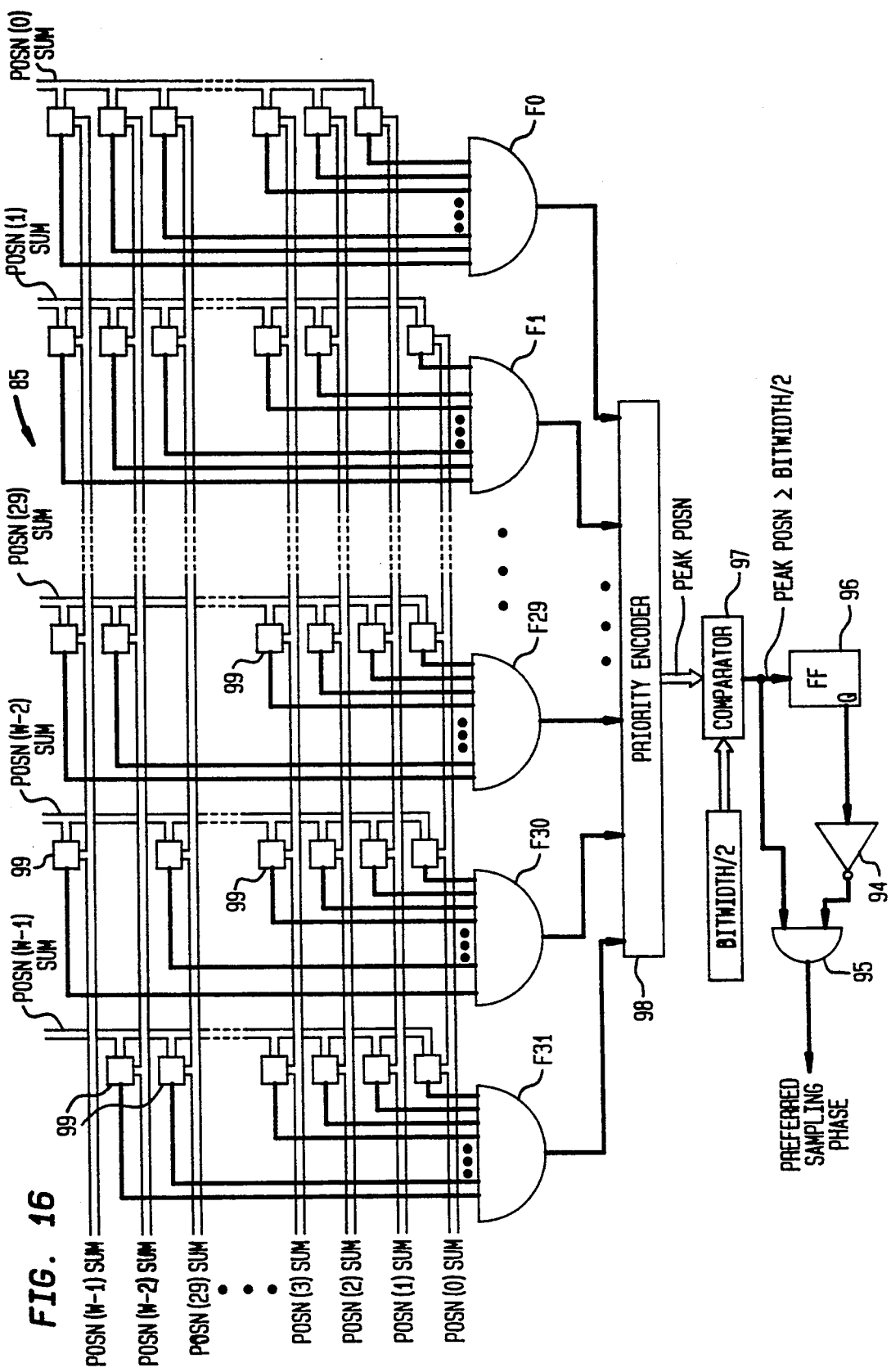
FIG. 16 is a block diagram showing a special purpose digital processor for performing the peak-locating functions of step 49' shown in FIG. 13.

To illustrate this embodiment, the processor of FIGS. 14-16 is shown with sufficient circuitry to permit processing data that has been oversampled with any number of sensor pixels up to eight per data cell 36. In practice there will preferably be between 3.0 and 8.0 sensor pixel positions 38 for each data cell 36. As such, this example assumes that the scanned data has a maximum bitwidth of 8.0 pixels. Also, the bin size in this example is assumed to be $\frac{1}{4}$ pixel. Consequently, the resulting histogram will have 32 bins with each bin spanning $\frac{1}{4}$ pixel. It is also noted that in this example and based on the above assumptions, the fractional portions of the suggested distances may be expressed using only two bits instead of six bits as shown in FIG. 11.

The histogram of step 48' is constructed with the circuits of FIGS. 14 and 15. In FIG. 14, the suggested distances (1)-(N) of registers R1-RN, respectively, are shown inputted to a different one of sixteen demultiplexers (DEMUX) (0)-(15). It is assumed here that the number N in FIG. 11 is equal to sixteen and that registers R1-RN yield sixteen suggested distances. Each DEMUX has thirty-two outputs labeled (0)-(31). These thirty-two outputs define the thirty-two bins of the histogram. For example, output (0) of each DEMUX corresponds to bin (0), output (1) corresponds to bin (1), and so on. As indicated above for this example, each bin has a width of $\frac{1}{4}$ pixel. Each DEMUX will decode its suggested distances into the appropriate pixel interval or bin number by providing an output signal on one of its output lines. For example, if a suggested distance of $4\frac{3}{4}$ pixels (i.e. 19/4 pixels) is inputted on the input bus of DEMUX (1), its output (19) would be true and its other outputs would be false, thereby indicating that the suggested distance at DEMUX (1) is located in bin (19).

On each clock cycle, the sixteen suggested distances are each decoded by the corresponding DEMUX. Therefore, on each clock cycle a true signal will appear on one of the thirty-two outputs of each DEMUX. A bank of thirty-two adders A0-A31 is connected to the outputs of the DEMUXs. Each adder A0-A31 corresponds to a different bin of the histogram and, as such, has its inputs connected to common outputs from each of the DEMUXs. Specifically, outputs (0) from each DEMUX are connected to adder (0), outputs (1) are connected to adder (1), and so on.

The outputs of adders A0-A31 are each connected to a five-bit bus. These outputs designate the number of suggested distances in each of the thirty-two bins (0)-(31). Specifically, the output of adder A0 will be a five-bit number specifying the number of suggested distances in bin (0) which includes the interval between 0.0 and $\frac{1}{4}$ pixel. In FIG. 14, this five-bit number is designated "bin (0) sum." The bin (1) sum, outputted by adder A1, specifies the number of suggested distances having values in the interval between $\frac{1}{4}$ and $\frac{1}{2}$ pixel. The bin (31) sum, outputted by adder A31, specifies the number of suggested distances between $7\frac{3}{4}$ and 8.0 pixels. To summarize, the outputs of adders A0-A31, on each clock cycle, constitute a circular histogram that specifies the distribution of the suggested distances that fall in each of the pixel intervals. Each pixel interval (bin size) is $\frac{1}{4}$ pixel, the total number of intervals is 32 bins and the total number of pixels covered by the histogram is 8.0 pixels.

The processor finds a five-bin peak of this histogram. The five-bin peak is found by grouping adjacent bins in sets of five, summing their counts and then comparing these sums to find the group with the maximum sum. To perform these functions, a bank of thirty-two adders C0-C31 is used to sum the outputs of adders A0-A31 in groups of five.

Adders C2-C29 (see FIG. 14) sum the outputs of the twenty-eight five-bin sets that range between A0 and A31. Specifically, adder C2, connected to the outputs of five adders A0-A4, sums the number of suggested distances that are located in the five-bin set made up of bins (0)-(4). The output of adder C2 is labeled "POSN (2) sum" to designate that this output corresponds to the sum of the set of bins having bin (2) in the center position. Likewise, the output of adder C3 is POSN (3) sum and corresponds to the sum of bins (1), (2), (3), (4), (5), which has bin (3) in the center position. Still further, the output of adder C29, which corresponds to the sum of bins (27)–(31), is designated POSN (29) sum.

Because the histogram is circular, there will be a wraparound point. For example, assuming a bitwidth of 8.0 pixels, bin (31) is effectively adjacent to bin (0) for the same reason that bin 12 is adjacent to bin 1 in the FIG. 8 histogram. In this case, bin (31) is referred to as the wraparound point. Consequently, a total of thirty-two five-bit sets are possible when the wraparound sets are considered. The four wraparound sets will produce four wraparound sums in addition to the twenty-eight ordinary sums that are produced by adders C2–C29. FIG. 14 shows the ordinary sums while the wraparound sums are shown in FIG. 15 to be described below. Bins (0)–(3) will always be part of the wraparound sets. For instance, when bin (31) is the wraparound point, one of the wraparound sums will be the sum of the set of bins (30), (31), (0), (1), (2) and will correspond to POSN (0) sum, which is outputted by adder C0.

The wraparound point of the circular histogram will occur at different locations depending on the current value of the bitwidth. For example, if the current bitwidth is 8.0 pixels, the wraparound point will be bin (31). However, if the current bitwidth is only 3.74 pixels, the wraparound point will be bin (14). (Since each bin is $\frac{1}{4}$ pixel, only fifteen bins (0)–(14) will be required to span the bitwidth of 3.74 pixels). Provision for grouping the bins to properly reflect the wraparound point is accomplished with the barrel shifter 91 (see FIG. 14) and the circuit shown in FIG. 15.

Barrel shifter 91 shown in FIG. 14 has twenty-eight inputs, connected to the output buses of adders A4–A31, and four output buses E1–E4. Barrel shifter 91 is a logic switch that selectively connects four of the input buses to output buses E1–E4. This barrel shifter is controlled by a bitwidth input 92. As noted above, the wraparound point will shift by one bin for each $\frac{1}{4}$ difference in the bitwidth. Barrel shifter 91 functions to selectively connect four of the input buses to output buses E1–E4. The input bus corresponding to the wraparound bin is connected to output bus E4. The input buses corresponding to the three bins that precede the wraparound bin are connected to output buses E1–E3. For example, if the current bitwidth is between $7\frac{3}{4}$ and 8.0 pixels, the buses extending from adders A28–A31 will be connected to buses E1–E4, respectively. If the current bitwidth is between $7\frac{1}{2}$ and $7\frac{3}{4}$ pixels, adders A27–A30 are connected to buses E1–E4, respectively. In like manner, barrel shifter 91 continues to shift its input-output connections by one bus for each $\frac{1}{4}$ pixel change in the bitwidth appearing at the input 92.

As shown in FIG. 15, buses E1–E4 are designated bin (W-4) sum, bin (W-3) sum, bin (W-2) sum and bin (W-1) sum, respectively. In this notation, W corresponds to the number of bins in the histogram needed to span the bitwidth. Bin (W-1) sum corresponds to the sum of the wraparound bin; bin (W-2) represents the bin that is one less than the wraparound bin and so forth. For example, if the current bitwidth is between $7\frac{3}{4}$ and 8.0 pixels, all thirty-two bins will be needed in the histogram and, therefore, W=32 and bin (W-1)=bin (31). If the current bitwidth is only 3.74 pixels, fifteen bins are all that are needed in the histogram. In this case the active bins are bins (0)–(14), making the wraparound bin (W-1)=bin (14). Consequently, for this latter example, barrel shifter 91 will connect buses E1–E4 to the buses extending from adders A11–A14, respectively. In this situation where the number of bins is fifteen, W=15, bin (W-1) sum is bin (14) sum, bin (W-2) sum is bin (13) sum, and so forth.

The outputs of adders C0, C1, C30, C31 provide the sums for the four wraparound sets. Adder C31 outputs POSN (W-1) sum, i.e. the sum of the five adjacent bins with the wraparound bin (W-1) in the center position. If the wraparound bin is bin (14), the output of adder C31 would be POSN (14) sum and would be equal to the sum of the outputs of adders A12, A13, A14, A0, A1.

Peak detector 85 shown in FIG. 16 locates the histogram peak by comparing the sums at the outputs of adders C0–C31 to each other. This process will locate the sum (or sums) with the maximum value. Detector 85 includes a matrix of buses having POSN (0)–(W-1) sums arranged in both rows and columns. Crossing points that do not involve the same bus are connected by comparators 99. Specifically, thirty-one comparators 99, each of which has a binary output connected to AND gate F31, compares POSN (W-1) sum to all other sums, i.e. POSN (0) sum to POSN (W-2) sum. In like manner, the other AND gates F0–F30 have thirty-one inputs each that are connected to the outputs of comparators 99 in a different column. Each comparator 99 produces a binary true output if the sum on the vertical bus to which it is connected is equal to or greater than the sum on the horizontal bus to which it is connected. The output from any of AND gates F0–F31 is true if all of its inputs are true, which will occur when the sum on the corresponding vertical bus is equal to or greater than each of the sums on the other buses. A true output from any of AND gates F0–F31 indicates a maximum for the corresponding sum. For example, a true output at AND gate F29 indicates that POSN (29) sum was a maximum. In a given clock cycle more than one of these AND gates may indicate a maximum.

The outputs of AND gates F0–F31 are connected to the inputs of a priority encoder 98, which has a five-bit output bus. Priority encoder 98 has two functions. First, it will determine which bin will be selected when more than one maximum is indicated by the outputs of AND gates F0–F31. This selection may be made at random or may be made based on some predetermined priority criteria. The second function of priority encoder 98 is to encode the position of the maximum (PEAK POSN) using a five-bit number. For example, if POSN (29) sum is the maximum, then PEAK POSN=29. In essence, PEAK POSN is a number that identifies which bin corresponds to the histogram peak.

Comparator 97 compares PEAK POSN to one-half the current bitwidth. This comparison is made to help identify the pixel B that corresponds to the histogram peak as it passes the origin of the histogram. The identified pixel B is the preferred sampling phase.

Comparator 97 will be true when PEAK POSN≧bitwidth/2. It is noted that PEAK POSN is a number that gets smaller as the peak moves around the circular histogram until the peak passes the origin. When the peak passes the origin, PEAK POSN will normally jump to a value comparable to bitwidth. This jump will cause a positive-going transition to occur at the output of comparator 97. Flip-flop 96, inverter 94 and AND gate 95 detect these positive-going transitions.

Flip-flop 96 acts as a one-bit delay. A true output from AND gate 95 will occur during those cycles when PEAK POSN changes from a lower value to a value that is equal to or greater than bitwidth/2. As such, AND gate 95 will produce a true output only when the output of comparator 97 has a positive-going transition, i.e. when the current output of comparator 97 is true and its previous output was false. When the output of AND gate 95 is true, the current pixel B will be one pixel position 38 past the center of its data cell 36. As such, the output of AND gate 95 will indicate that the preferred sampling phase occurred during the previous cycle. In step 50 shown in FIG. 13, the output of gate 95 is used to select the binary pixel B that occurred at the preferred sampling phase.

Obviously many modifications of the present invention are possible in the light of the above teachings. For example, the preferred embodiment is described with respect to the reading of digital data stored on film. Those skilled in the art will clearly recognize that my invention has general application in retrieving data stored on a variety of other mediums. It will be evident that the invention may be used in systems for retrieving data that is stored magnetically, electronically, optically, as in the present example, or otherwise.

Also, numerous variations in the sequence of the method steps, than that which I have described, will be readily recognized by those skilled in the art. In this regard, skilled artisans will appreciate that data sampling step 35, performed on the stream of thresholded binary pixels B in the present description, may be modified to operate directly on the grayscale image data such as the data line pixels P. In this regard, the data transitions in the gray scale image data may be located by interpolating the exact threshold-crossing points. Because these and many other modifications may be readily resorted to by those skilled in the art, it is to be understood that, within the scope of the appended claims, the invention may be practiced otherwise than as specifically described.

INDUSTRIAL APPLICABILITY AND ADVANTAGES

The present invention is useful in data sampling and particularly in systems that retrieve digital data that has been stored in so-called data cells on photographic film. The invention advantageously selects appropriate sampling points for each data cell more accurately than those previously attainable in the art so as to maintain proper bit-to-bit synchronization under essentially all conditions of service.

I claim:

1. Apparatus for retrieving data from a data storage medium having a plurality of data cells in which discrete values are stored said apparatus comprising:
   sample means for sampling said data at a plurality of sampling points in each of said data cells and for generating a stream of data samples;
   transition-detector means for detecting transistions in said stream of data samples;
   data-pitch means for estimating a current pitch of said data cells based on the distance between two of said transitions;
   transition-phase means responsive to said current pitch for determining a transition phases of said transitions;
   sampling-phase means, responsive to said transition-phase means, for finding a preferred sampling phase; and
   output means for constructing a data output signal from said data samples occurring at said preferred sampling phase.

2. The apparatus of claim 1 wherein said data storage medium is photographic film and said data is stored as grayscale images.

3. The apparatus of claim 1 wherein said data is digital data stored as a grayscale image on photographic film.

4. The apparatus of claim 3 wherein said sample means comprises:
   image sensor means for sensing said grayscale image such that each of said plurality of sampling points corresponds to an image pixel; and
   quantizing means, responsive to said image sensor means, for generating grayscale image data.

5. The apparatus of claim 2 wherein said data cells form contiguous rows on said film.

6. The apparatus of claim 1 wherein said sample means includes thresholding means for converting said data samples into a one-dimensional bit stream.

7. The apparatus of claim 6 wherein said data-pitch means includes initialization means, responsive to a predetermined test pattern of said data samples, for estimating an initial pitch of said data cells by determining the number of bits per data cell in said test pattern.

8. The apparatus of claim 6 wherein said data-pitch means includes update means for periodically estimating a current updated pitch of said data cells.

9. The apparatus of claim 8 wherein said transition-phase means includes means for determining a most recent of said transition phases as a function of a most recent estimate of said current updated pitch.

10. The apparatus of claim 9 wherein said transition-phase means includes N suggested-distance means, responsive to the N most recent of said transition phases, for determining N suggested distances from a current sampling point to a sampling point located at said preferred sampling phase.

11. The apparatus of claim 10 wherein said sampling-phase means includes histogram means for counting the number of said N suggested distances that fall in each of a plurality of intervals having a total width substantially equal to said current updated pitch to find an interval with a maximum count of said N suggested distance, said interval with said maximum count of said N suggested distance located therein being substantially one sampling point 12. The apparatus of claim 11 wherein said sampling-phase means includes averaging means for averaging the N suggested distances in said maximum count to find said preferred sampling phase.

13. The apparatus of claim 11 wherein said sampling-phase means includes means for tracking the position of said maximum count to locate said preferred sampling phase when said maximum count is at a predetermined position.

14. The apparatus of claim 13 wherein said predetermined position is located at a sampling point corresponding to the midpoint of said data cell.

15. The apparatus of claim 11 wherein said update means includes means, responsive to said transition-phase means and said sampling-phase means, for causing said current updated pitch to be updated when said most recent of said transition phases is within a predetermined distance from said preferred sampling phase.

16. The apparatus of claim 15 wherein each of said N suggested-distance means includes a register means for storing non-integer values of said N suggested distances.

17. The apparatus of claim 16 wherein said register means includes reload means, responsive to said transition detector means, for reloading a different one of said register means with an updated one of said N suggested distances based on the transition phase of said most recent of said phase transitions.

18. The apparatus of claim 17 wherein each said register means includes logic means, responsive to said sample means, for decreasing said N suggested distances by one unless said N suggested distance is less than one or said register means is being reloaded.

19. The apparatus of claim 18 wherein said logic means includes means for increasing said N suggested distances by said current updated pitch when said suggested distance is less than one and said corresponding register means is not being updated with an updated one of said N suggested distances.

20. The apparatus of claim 19 wherein said data is digital data stored as a grayscale image and said data cells form contiguous rows on said data storage medium.

21. A method of retrieving data from a data storage medium having a plurality of data cells in which discrete values are stored, said method comprising the steps of:

generating a stream of data samples by sampling said data at a plurality of sampling points in each of said data cells;
   detecting transitions in said stream of data samples;
   estimating a current pitch of said data cells based on two of said transitions;
   determining the transition phases of said transitions based on said current pitch;
   determining a preferred sampling phases from said transition phases; and
   constructing a data output signal from said data samples occurring at said preferred sampling phase.

22. The method of claim 21 wherein said data is digital data stored as a grayscale image on photographic film and said data cells form contiguous rows on said photographic film, and said generating a stream of data samples step includes the step of sensing said grayscale image such that each of said plurality of sampling points corresponds to an image pixel and said data samples are grayscale image data.

23. The method of claim 21 further including the step Of thresholding said data samples into a one-dimensional bit stream.

24. The method of claim 23 further including the step of generating an estimate of an initial pitch of said data cells by determining the number of sampling points per data cell.

25. The method of claim 24 further including the step of periodically estimating a current updated pitch of said data cells.

26. The method of claim 25 further including the step of determining the most recent of said transition phases as a function of the most recent estimate of said current updated pitch.

27. The method of claim 26 further including the step of determining N suggested distances from a current sampling point to a current preferred sampling phase based on the N most recent of said transition phases.

28. The method of claim 27 further including the step of generating a histogram for counting the number of said N suggested distances in each of a plurality of intervals having a total width substantially equal to said current updated pitch, and finding an interval with set of said N suggested distances having a maximum count, step said interval with said maximum count associated with one of said sampling points.

29. The method of claim 28 further including the step of generating an average of the N suggested distances in said set to find said preferred sampling phase.

30. The method of claim 28 further including the step of tracking the position of said set to locate a preferred phase when said set is at a predetermined position.

31. The method of claim 30 wherein said predetermined position is located at the sampling point corresponding to the midpoint of said data cell.

32. The method of claim 29 further including the step of updating said current updated pitch when said most recent of said transition phases is within a predetermined distance from said preferred sampling phase.

33. The method of claim 32 further including the step of storing non-integer values of said N suggested distances in a set of N registers.

34. The method of claim 33 further including the step of reloading a different one of said set of N registers with an updated one of said N suggested distances based on the transition phase of said most recent of said transitions.

35. The method of claim 34 further including the step of decreasing said N suggested distances by one unless an N suggested distance is less than one or said different one of said set of register is being reloaded.

36. The apparatus of claim 35 further including the step of increasing each of said N suggested distances by said current updated pitch when said each N suggested distance is less than one and said corresponding one of said set of registers is not being updated.

* * * * *